United States Patent
Nagata et al.

(10) Patent No.: US 6,920,921 B2
(45) Date of Patent: Jul. 26, 2005

(54) AIR CONDITIONER FOR VEHICLES WITH RIGHT STEERING WHEEL AND LEFT STEERING WHEEL

(75) Inventors: Osamu Nagata, Ichinomiya (JP); Kenji Ishida, Kariya (JP); Kazuma Inagaki, Hekinan (JP); Yoshihiro Goto, Anjo (JP)

(73) Assignee: DENSO Corporation, Kariya (JP)

( * ) Notice: Subject to any disclaimer, the term of this patent is extended or adjusted under 35 U.S.C. 154(b) by 33 days.

(21) Appl. No.: 10/100,540

(22) Filed: Mar. 18, 2002

(65) Prior Publication Data

US 2002/0129932 A1 Sep. 19, 2002

(30) Foreign Application Priority Data

Mar. 19, 2001 (JP) ........................................ 2001-078867
Mar. 30, 2001 (JP) ........................................ 2001-101602
Apr. 10, 2001 (JP) ........................................ 2001-111929

(51) Int. Cl.$^7$ .......................... F25B 29/00; B60H 1/00
(52) U.S. Cl. .......................... 165/202; 165/42; 165/43; 165/76; 165/137; 454/156; 454/160; 454/161; 454/139; 454/121; 237/12.3 A; 237/12.3 B; 62/244
(58) Field of Search .......................... 165/76, 137, 202, 165/42, 43; 454/139, 121, 156, 160, 161; 62/244; 237/12.3 A, 12.3 B (56) References Cited

U.S. PATENT DOCUMENTS 5,063,832 A * 11/1991 Mirumachi et al.
5,673,964 A    10/1997 Roan et al.
6,142,864 A *  11/2000 Uemura et al. .............. 454/121
6,186,885 B1   2/2001  Ahn et al.

FOREIGN PATENT DOCUMENTS

| FR | 2623776    |   | 6/1989 |
| GB | 2 065 866  |   | 7/1981 |
| JP | 60-4410    | * | 1/1985 |
| JP | 6-156049   |   | 6/1994 |
| JP | 8-164728   | * | 6/1996 |
| JP | 9-188124   |   | 7/1997 |
| JP | 10-16534   | * | 1/1998 |
| JP | 10-217761  | * | 8/1998 |
| JP | 11-20451   | * | 1/1999 |
| JP | 11-78476   | * | 3/1999 |
| JP | 2000-85335 | * | 3/2000 |

* cited by examiner

Primary Examiner—John K. Ford
(74) Attorney, Agent, or Firm—Harness, Dickey & Pierce, PLC (57) ABSTRACT

In a vehicle air conditioner, a case member of an inside/outside air switching portion is disposed at an approximate center in an interior unit in a vehicle width direction, to define an air passage extending in the vehicle width direction. An outside air suction port is provided in the case member, and first and second openings are opened in the case member at both side ends of the air passage in the vehicle width direction. One of the first and second openings is used as an inside air suction port, and the other one thereof is used as an outlet passage port. In addition, the outlet passage port of the case member is coupled to a suction port of a blower through a connection duct.

13 Claims, 8 Drawing Sheets

AIR CONDITIONER FOR VEHICLES WITH RIGHT STEERING WHEEL AND LEFT STEERING WHEEL

CROSS-REFERENCE TO RELATED APPLICATION

This application is related to Japanese Patent Applications No. 2001-78867 filed on Mar. 19, 2001, No. 2001-101602 filed on Mar. 30, 2001, and No. 2001-111929 filed on Apr. 10, 2001, the contents of which are hereby incorporated by reference.

BACKGROUND OF THE INVENTION

1. Field of the Invention

The present invention relates to an air conditioner having an inside/outside air switching portion that can be readily used in common for both a vehicle having a right steering wheel and a vehicle having a left steering wheel.

2. Description of Related Art

Recently, in an arrangement of an air conditioner in a vehicle, a blower unit having an inside/outside air switching portion is generally disposed at a front-passenger's seat side within an instrument panel, and an air-conditioning unit for adjusting temperature of air blown by the blower unit is generally disposed an approximate center within the instrument panel in a vehicle width direction. Accordingly, in the air conditioner, the inside/outside air switching portion, that can be used in common for a vehicle having a right steering wheel and a vehicle having a left steering wheel, is required.

On the other hand, in a conventional air conditioner described in JP-A-9-188124, a rotary door having a circular-arc peripheral wall and a side plate is used as an inside/outside air switching door of an inside/outside air switching portion, in order to reduce operation force of the inside/outside air switching door and to increase an air opening area of the inside/outside air switching portion. However, in the air conditioner, a blower unit having the inside/outside air switching portion is arranged at a side of an air-conditioning unit having a heat exchanger and an air-outlet mode switching portion. Therefore, a mounting space for mounting the air conditioner on the vehicle becomes larger. In addition, because the rotary door is formed into approximately one-side opened rectangle shape with angle parts in an axial direction, the angle parts of the rotary door readily interferes with an equipment adjacent to the rotary door.

SUMMARY OF THE INVENTION

In view of the foregoing problems, it is an object of the present invention to provide a vehicle air conditioner having an inside/outside air switching portion which can be readily used in common for both a vehicle having a right steering wheel and a vehicle having a left steering wheel.

It is an another object of the present invention to provide a vehicle air conditioner in which inside air around a driver's seat side in a passenger compartment is readily sucked in an inside/outside air switching portion.

It is a further another object of the present invention to provide a vehicle air conditioner including an interior unit having an inside/outside air switching portion integrated therein. The interior unit is disposed inside an instrument panel in a passenger compartment in a small mounting space.

According to the present invention, in an inside/outside switching portion of an air conditioner, a case member defines an air passage extending in a vehicle width direction, to have an outside air suction port for introducing outside air outside the passenger compartment into the air passage, and first and second openings opened in the air passage at right and left end sides of the air passage in the vehicle width direction. One of the first and second openings is used as an inside air suction port for introducing inside air inside the passenger compartment into the air passage, and the other one of the first and second openings is used as an air outlet port. In addition, the air outlet port of the case member is coupled to a suction port of a blower through a connection duct, and an inside/outside air switching member is disposed in the case member for opening and closing the outside air suction port and the inside air suction port. Accordingly, one of the first and second openings of the case member can be used as the inside air suction port and the other one thereof can be used as the air outlet port in accordance with a vehicle having a right steering wheel or a vehicle left steering wheel. Therefore, the case member of the inside/outside air switching portion can be used readily in common, regardless of the vehicle having the right steering wheel and the vehicle having the left steering wheel.

Preferably, one of the first and second openings, positioned at a driver's seat side in the vehicle, is used as the inside air suction port, and the other one of the first and second openings, positioned at a front passenger's seat side in the vehicle, is used as the air outlet port. Therefore, inside air can be readily introduced from a space around a driver's seat side in the passenger compartment, regardless the vehicle having the right steering wheel and the vehicle having the left steering wheel. Accordingly, air-conditioning feeling around the driver's seat side can be improved in the passenger compartment. Further, because the other one of the first and second openings, positioned at the front passenger's seat side in the vehicle, is used as the air outlet port, the arrangement of the connection duct connected to the air outlet port can be made easy.

Alternatively, the connection duct through which the air outlet port of the case member is coupled to the suction port of the blower has the outside air suction port for introducing outside air outside the passenger compartment into the air passage, and the inside/outside air switching member is disposed in the connection member. In this case, the one of the first and second openings of the case member can be used as the inside air suction port and the other one thereof can be used as an inside air outlet port, so that the air passage of the case member is used only as an inside air passage. Even in this case, the case member of the inside/outside air switching portion, extending in the vehicle width direction with the same shape, can be used in common for both the vehicle having the right steering wheel and the vehicle having the left steering wheel.

Alternatively, one of the first and second openings is used as an air suction port for introducing air, and the other one of the first and second openings is used as an air outlet port.

Further, the case member is disposed integrally with the mode switching portion at a vehicle front side of the mode switching portion, the one of the first and second openings is used as the inside air suction port for introducing inside air inside the passenger compartment, and the other one thereof is used as the air outlet port. Because the inside/outside air switching portion is integrally disposed with the mode switching portion at the vehicle front side of the mode switching portion, the inside/outside air switching portion can be readily proximate to a vehicle cowl portion, so that a connection between the outside air suction port of the inside/outside air switching portion and an outside air passage of the vehicle cowl portion can be made easy. Further, an interference between the inside/outside air switching portion and connection ducts connected to the mode switching portion can be prevented. In addition, because the inside/outside air switching door has a door surface extending in an approximate circular arc shape within a predetermined dimension in an axial direction of the rotation axis, and the inside air suction port and the outside air suction port are opened and closed by the door surface of the inside/outside air switching door. Therefore, the case member accommodating the inside/outside air switching door can be formed into a cylindrical shape. Accordingly, the interior unit including the inside/outside air switching portion integrated therein can be mounted in a small space in the vehicle.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–7. In the first embodiment, an interior unit 10 of a vehicle air conditioner is disposed at an approximate center position in a width direction (right-left direction) within an instrument panel (dashboard) provided at a front side in a passenger compartment. The interior unit 10 is mounted on a vehicle to correspond to the arrangement of FIGS. 1–3 in the vehicle up-down direction, in the vehicle front-rear direction and in the vehicle right-left direction.

The interior unit 10 of the first embodiment includes an inside/outside air switching portion 11, a blower 12, a heat-exchanging portion 13, an air-outlet mode switching portion 14, and a connection duct 15 connecting an outlet passage portion of the inside/outside air switching portion 11 and a suction port of the blower 12.

Figure 2:
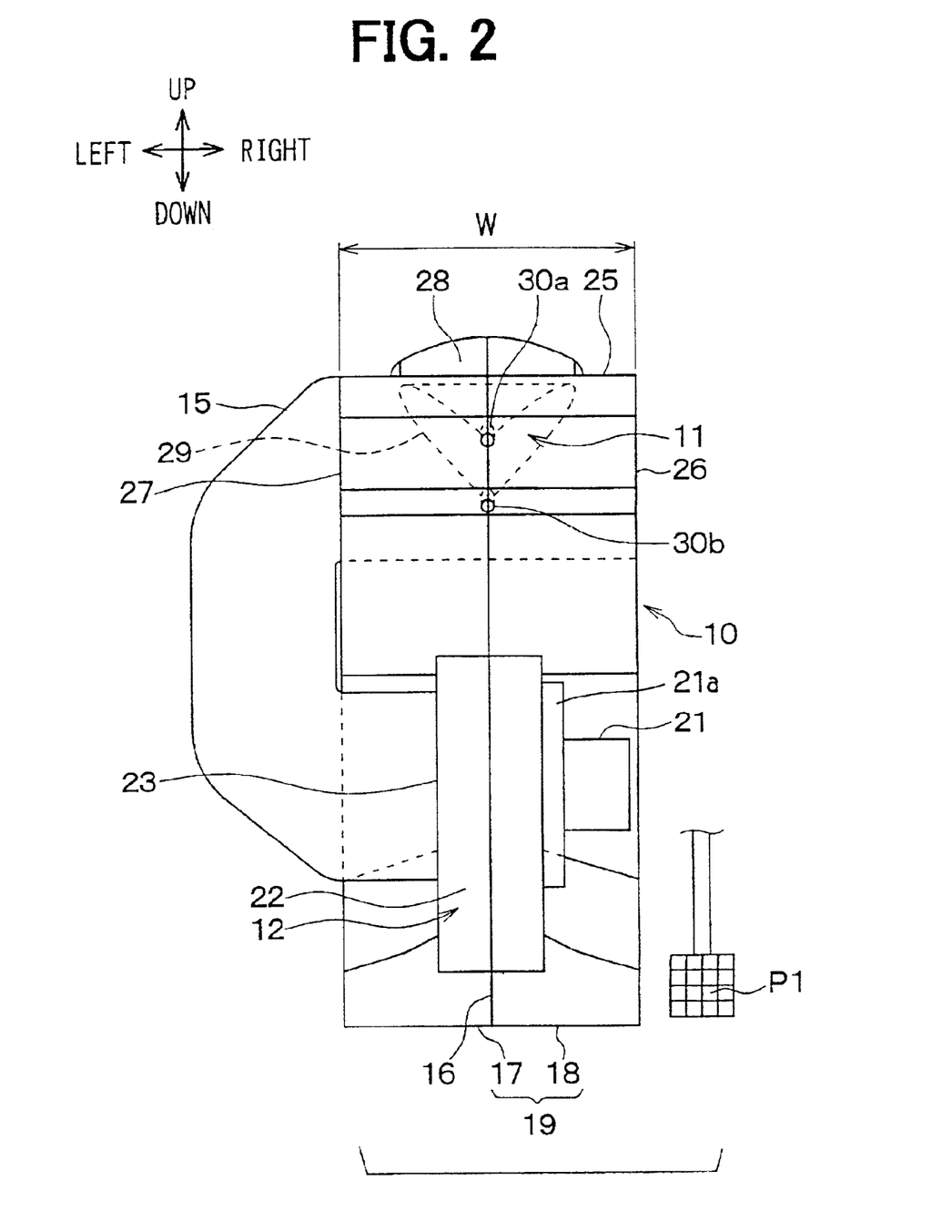
FIG. 2 is a front view of the interior unit for a vehicle having a right steering wheel, when being viewed from an interior of a passenger compartment, according to the first embodiment.
Figure 3:
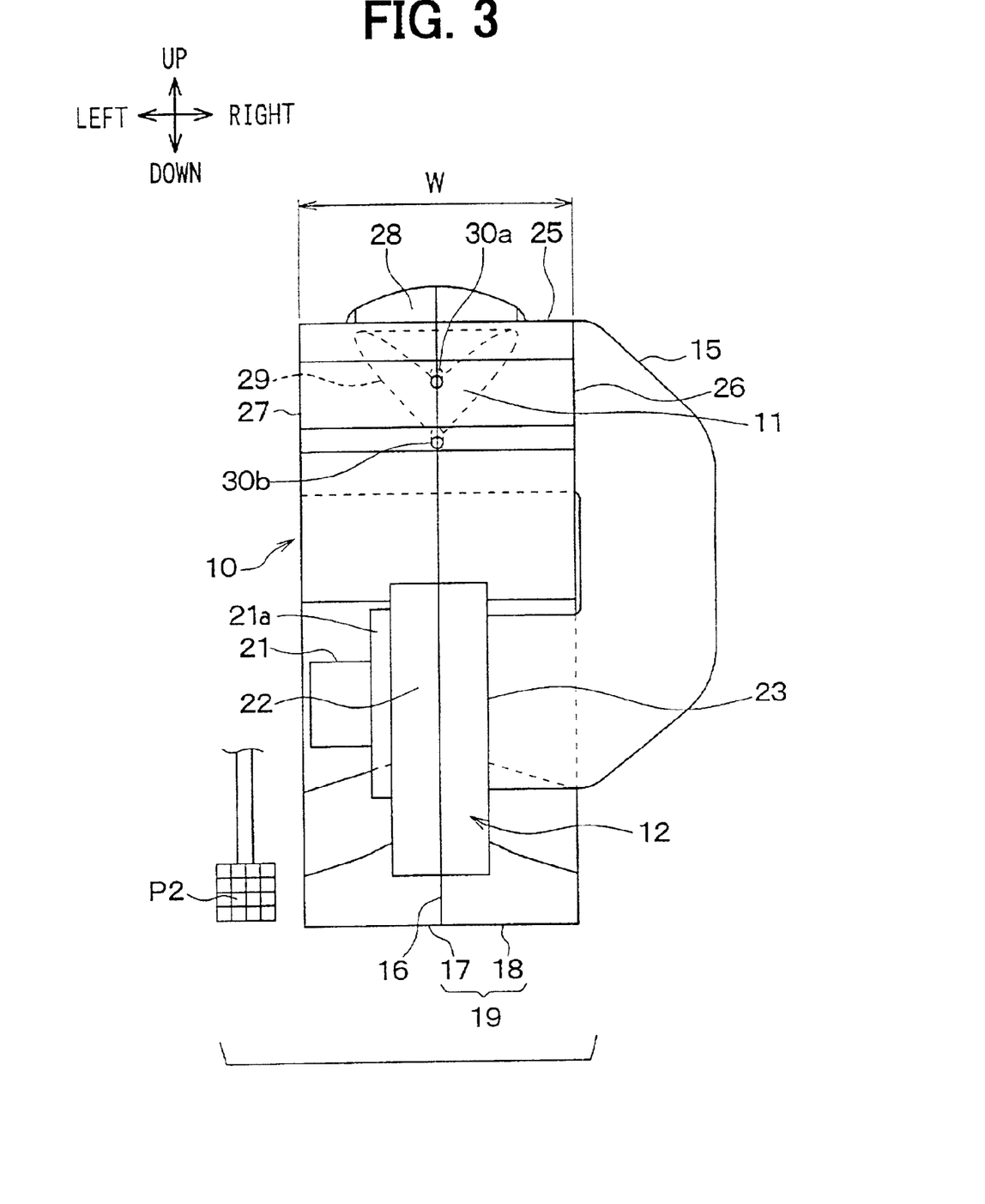
FIG. 3 is a front view of the interior unit for a vehicle having a left steering wheel, when being viewed from the interior of the passenger compartment, according to the first embodiment.

As shown in FIGS. 2 and 3, in the interior unit 10, a case 19 defining an air passage is constructed by integrally connecting and fastening left and right division case members 17, 18 divided at a division surface 16 at an approximate center position in the width direction. Each of the left and right division case members 17, 18 is made of resin, which has an elasticity to some degree and is superior in a strength, such as polypropylene. In the first embodiment of the present invention, the shape of the case 19 is formed to be right-left symmetrical relative to a division surface 16 of the case 19, so that the interior unit 10 is used in common for the vehicle having the right-steering wheel and for the vehicle having left-steering wheel.

Next, the inside/outside air switching portion and the blower 12 will be now described. The inside/outside air switching portion 11 is disposed above the heat-exchanging portion 13 at a vehicle front side of the heat-exchanging portion 13. The blower 12 is disposed at a lower side position on a vehicle rear side in the interior unit 10. The blower 12 includes a centrifugal multi-blades fan (sirocco fan) 20, a motor 21 for driving the fan 20, and a screw casing 22. The fan 20 is disposed in the scroll casing 22, so that a rotation shaft 20a is in the vehicle width direction, and a suction port 23 (see FIGS. 2 and 3) of the fan 20 is opened toward a side in the vehicle width direction.

In the first embodiment, one of openings provided on both right and left side surfaces of the scroll casing 22 is used as the suction port 23. Specifically, in the vehicle having the right steering wheel, as shown in FIG. 2, the left side opening of the scroll casing 22 is used as the suction port 23, and the motor 21 for driving the fan 20 is disposed in the right side opening of the scroll casing 22 so that the right side opening of the scroll casing 22 is closed by a flange portion 21a of the motor 21. Conversely, in the vehicle having the left steering wheel, as shown in FIG. 3, the right side opening of the scroll casing 22 is used as the suction port 23, and the motor 21 for driving the fan 20 is disposed in the left side opening of the scroll casing 22 so that the left side opening of the scroll casing 22 is closed by the circular flange portion 21a of the motor 21.

Figure 1:
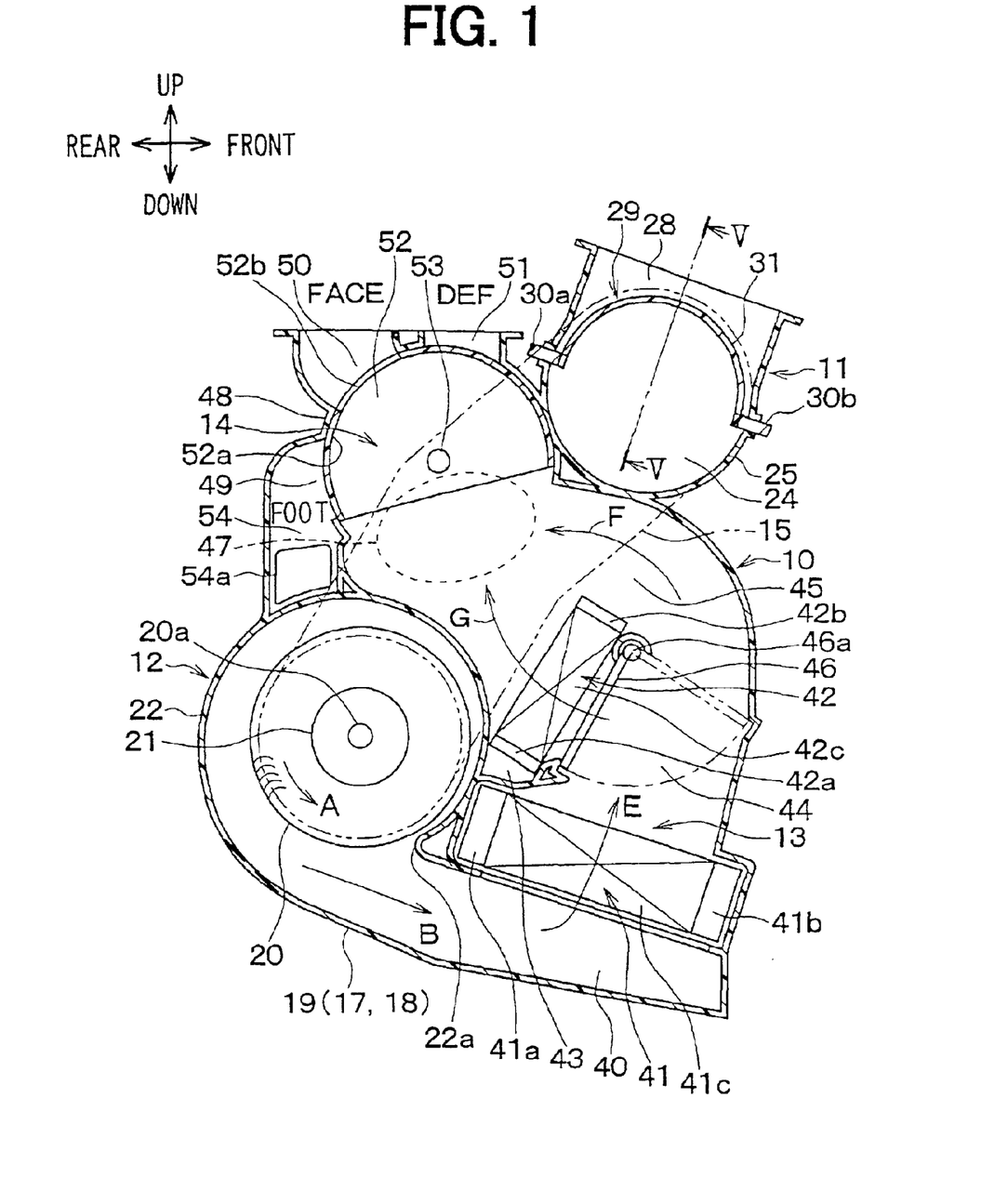
FIG. 1 is a schematic sectional view showing an interior unit of a vehicle air conditioner according to a first preferred embodiment of the present invention.

For example, a width dimension of the scroll casing 22 is about 100 mm, that is greatly smaller than a width dimension W (e.g., about 200 mm) of the interior unit 10. As shown in FIGS. 2 and 3, the scroll casing 22 and the fan 20 disposed within the scroll casing 22 are positioned at an approximate center portion of the interior unit 10 in the width direction. Further, as shown in FIG. 1, a nose portion 22b used as a scroll start portion of a scroll shape of the scroll casing 22 is positioned at a vehicle front side relative to the fan 20. Accordingly, by the rotation of the fan 20 as shown by the arrow A in FIG. 1, suction air sucked from the suction port 23 is blown from a vehicle rear side to a vehicle front side as shown by the arrow B in FIG. 1, and is blown to a bottom side (a side under an evaporator 41) within the case 19 of the interior unit 10.

Figure 4:
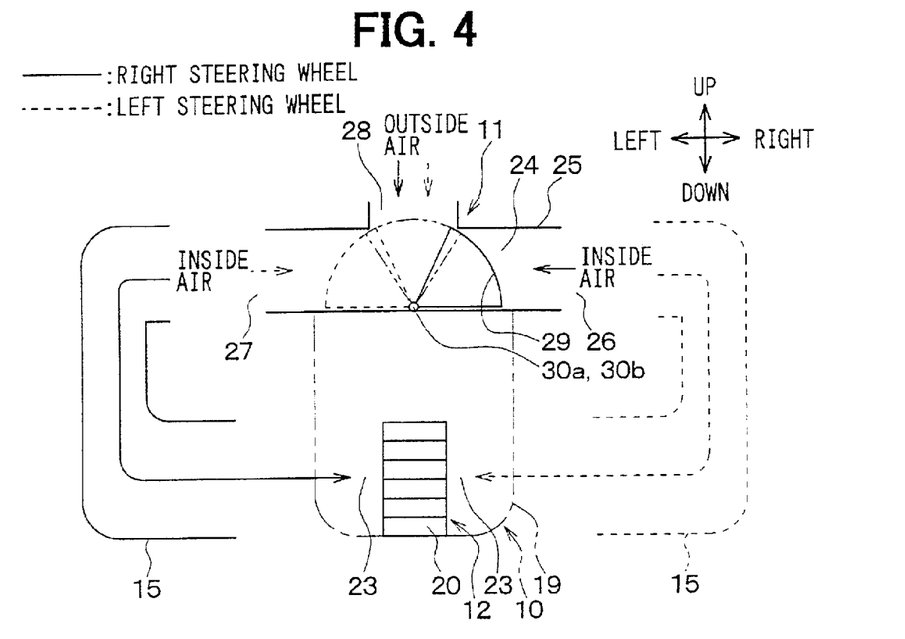
FIG. 4 is a schematic diagram for explaining a connection structure between an inside/outside air switching portion and a blower, in the vehicle having the right steering wheel and in the vehicle having the left steering wheel, according to the first embodiment.

FIG. 4 shows a connection structure between the inside/outside air switching portion 11 and the blower 12. As shown in FIG. 4, in the inside/outside air switching portion 11, an air passage 24 extending in the vehicle width direction is formed by a case member 25. The case member 25 of the inside/outside air switching portion 11 is formed as a part of the case 19 to be integrally with the case 19. The case member 25 is formed into an approximate cylinder having an approximate circular sectional shape as shown in FIG. 1. The case 25 has a first opening 26 (i.e., right side opening) at one end side of the air passage 24 in the vehicle width direction, and a second opening 27 (i.e., left side opening) at the other side of the air passage 24 in the vehicle width direction.

As shown in FIGS. 2 and 3, an outside air suction port 28 is provided on an upper side of the air passage 24 in the case member 25 at an approximate center in the vehicle width direction. In the first embodiment, one of the first opening 26 and the second opening 27 of the case member 25 is used as an inside air suction port, and the other one thereof is used as the outlet passage port connected to an upstream end of the connection duct 15.

Specifically, in the vehicle having right steering wheel shown by the solid line in FIG. 4 and in FIG. 2, the first opening 26 is directly opened into the passenger compartment, so that the first opening 26 is used as the inside air suction port. In this case, the upstream end of the connection duct 15 is connected to the second opening 27, and the downstream end of the connection duct 15 is connected the suction port 23 on the left side surface of the scroll casing 22.

On the other hand, in the vehicle having left steering wheel shown by the chain line in FIG. 4 and in FIG. 3, the second opening 27 is directly opened into the passenger compartment, so that the second opening 27 is used as the inside air suction port. In this case, the upstream end of the connection duct 15 is connected to the first opening 26, and the downstream end of the connection duct 15 is connected the suction port 23 on the right side surface of the scroll casing 22.

Figure 5:
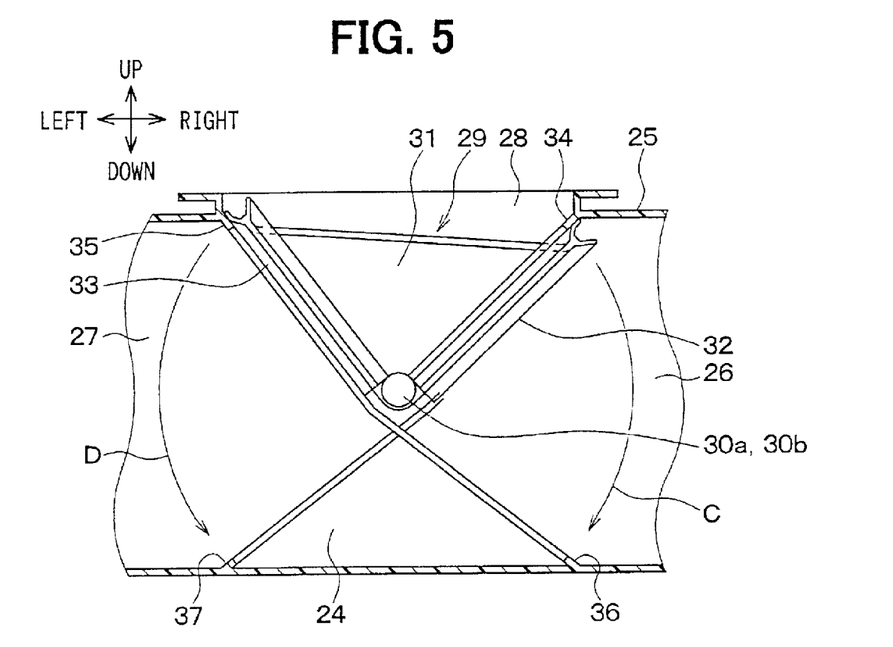
FIG. 5 is a cross-sectional view taken along line V-V in FIG. 1.

An inside/outside air switching door 29 is disposed under the outside air suction port 28 at a center portion in the air passage 24 of the case member 25 in the vehicle width direction, to be rotatable around rotation shafts 30a, 30b. FIG. 5 is a cross-section view taken along line V—V in FIG. 1, showing the shape of the inside/outside air switching door 29. FIGS. 6A–6D also show the shape of the inside/outside air switching door 29.

Figure 6A:
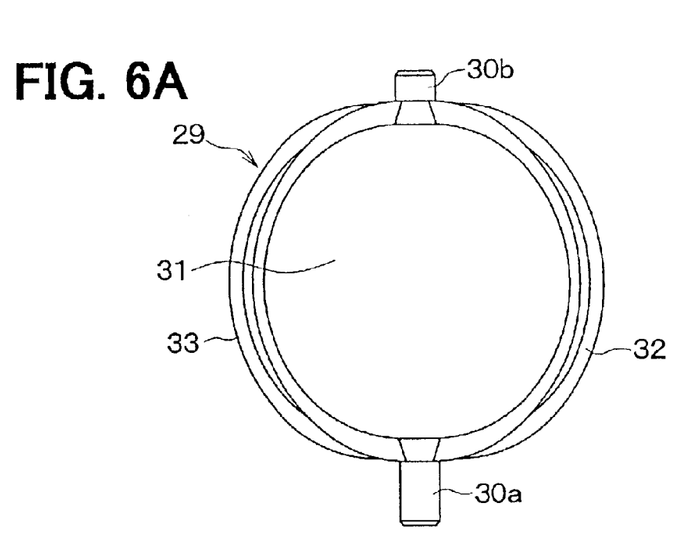
FIG. 6A is a plan view of an inside/outside air switching door.
Figure 6B:
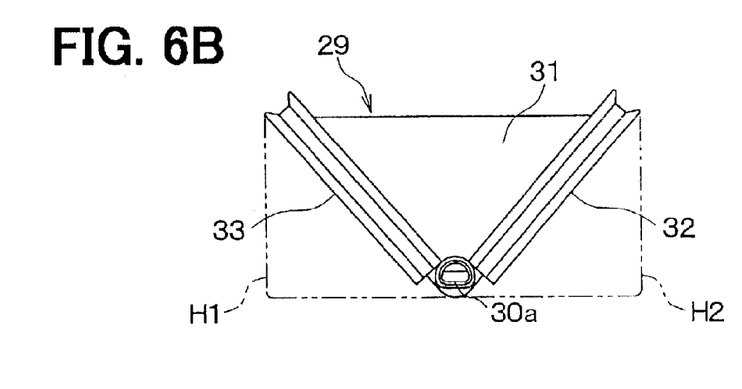
FIG. 6B is a front view of the inside/outside air switching door.
Figure 6C:
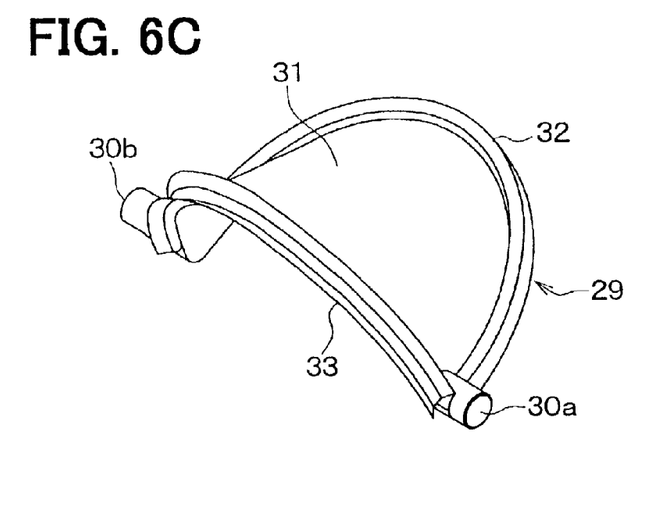
FIG. 6C is a perspective view of the inside/outside air switching door.
Figure 6D:
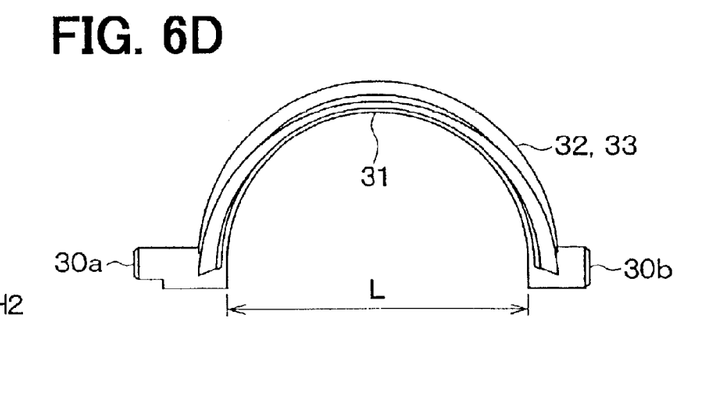
FIG. 6D is a side view of the inside/outside air switching door, according to the first embodiment.

For example, in the first embodiment, a door body 31 is constructed by removing the chain line portions H1, H2 shown in FIG. 6B from the surface of a semi-cylinder. Accordingly, as shown in FIGS. 1 and 6D, the door body 31 of the inside/outside air switching door 29 is formed between the rotation shafts 30a, 30b separated by a predetermined distance L, to have a circumference surface extending in a circular arc shape in the vehicle front-rear direction within the predetermined distance L. In addition, as shown in FIGS. 5 and 6B, the door body 31 has a triangular shape when being viewed from a vehicle front side or a vehicle rear side of the inside/outside air switching door 29. Here, the triangular shape of the door body 31 is set as shown in FIG. 5 so that the area of the triangular shape of the door body 31 from being enlarged from a lower side toward an upper side.

The rotation shafts 30a, 30b are arranged at both end portions of the door body 31 in the vehicle front-rear direction. In the first embodiment, the door body 31 and the rotation shafts 30a, 30b are integrally molded by resin, for example. Further, elastic seal members 32, 33 are fixed at both peripheral ends of the door body 31 in the vehicle width direction. The elastic seal members 32, 33 are made of an elastic material such as a rubber, and are formed into a lip shape having a V-shaped cross-section.

FIG. 5, the rotation shafts 30a, 30b are disposed around the center portion of the cylindrical air passage 24 to be arranged in the vehicle front-rear direction. In the state of FIG. 5, when the inside/outside air switching door 29 is used for the vehicle having the right steering wheel, V-shaped left-side top portions of the seal members 32, 33 of the door body 31 press-contact seal surfaces 34, 45 of the case member 25 around the outside air suction port 28 to close the outside air suction port 28. In addition, because the air passage 24 of the case member 25 between the first and second opening portions 26, 27 is opened, an inside air suction mode is set in FIG. 5.

When the inside/outside air switching door 29 is rotated around the rotation shafts 30a, 30b as shown by the arrow C in FIG. 5 from the state of FIG. 5, the V-shaped right side top end portion of the elastic seal member 33 press-contacts the seal surface around the outside air suction port 28, and the V-shaped right side end portion of the elastic seal member 32 press-contacts a seal surface 36 on the inner wall defining the air passage 24, so that the first opening portion 26 used as the inside air suction port is closed and the outside air suction port 28 is fully opened. Accordingly, in this case, an outside air suction mode is set.

In the vehicle having the left steering wheel shown in FIG. 3, the V-shaped right-side top end portion of the elastic seal member 32 press-contacts the seal surface 34 around the outside air suction port 28, and the V-shaped right side end portion of the elastic seal member 33 press-contacts the seal surface 35 around the outside air suction port 28, so that the outside air suction port 28 is fully closed. When the outside air suction port 28 is fully closed, the first and second openings 26, 27 of the air passage 24 are opened, so that the inside air suction mode is set.

Further, when the inside/outside air switching door 29 is rotated around the rotation shafts 30a, 30b as shown by the arrow D in FIG. 5, the V-shaped left-side top end portion of the seal member 32 of the door body 31 press-contacts the seal surface 35 of the case member 25 around the outside air suction port 28, and the V-shaped left-side top end portion of the seal member 33 press-contacts the seal surface 37 on the inner wall defining the air passage 24, so that the second opening 27 used as the inside air suction port is closed, and the outside air suction port 28 is fully opened. Accordingly, the outside air suction mode is set. In the first embodiment, the inside/outside air switching door 29 is formed into a rotatable door having the rotation shafts 30a, 30b. However, the inside/outside air switching door 29 can be formed into a general plate-like door.

Next, the heat exchanging portion 13 disposed within the case 19 of the interior unit 10 will be now described. The heat-exchanging member 13 is disposed at a vehicle front side of the blower 12. In the first embodiment of the present invention, the heat-exchanging portion 13 includes an evaporator 41 used as a cooling heat exchanger, and a heater core 42 used as a heating heat exchanger. An inlet passage 40 extending from the outlet side of the scroll casing 22 of the blower 12 toward the vehicle front side is provided at the most bottom side of the case 19 under the evaporator 41. That is, the evaporator 41 is disposed above the inlet passage 40. The evaporator 41 has substantially a thin rectangular shape, and is disposed approximately horizontally at an upper position separated from a bottom portion of the case 19 by a predetermined distance. In the first embodiment, the evaporator 41 is not disposed strictly horizontally, but is tilted downwardly at a downstream air side from a horizontal direction by a small angle.

Low-pressure refrigerant decompressed in a decompression unit of a refrigerant cycle is introduced into the evaporator 41. In the evaporator 41, low-pressure refrigerant is evaporated by absorbing heat from air, so that air passing through the evaporator 41 is cooled. Because the evaporator 41 is tilted slightly downwardly from the vehicle rear side to the vehicle front side, condensed water generated in the evaporator 41 is collected to a downstream air side along the air flow, and is smoothly discharged to a bottom side from a tilted lower end. Because the bottom portion of the case 19, positioned under the evaporator 41, constructs a receiving portion of condensed water, the bottom portion is also tilted downwardly from the horizontal direction toward the downstream air side (vehicle front side) by a small angle, similarly to the arrangement of the evaporator 41. Thus, a front side end of the bottom portion of the case 19 becomes a lowest portion, and a discharge port for discharging condensed water to an outside is provided at the lowest side of the bottom portion.

The evaporator 41 includes a heat-exchanging core portion 41c disposed between two tank portions 41a, 41b. The core portion 41c is constructed by alternatively stacking and joining plural flat tubes and plural corrugated fins. The evaporator 41 is disposed, so that air in the inlet passage 40 passes through the core portion 41c from below upwardly as shown by the arrow E in FIG. 1.

The heater core 42 is disposed approximately vertically within the case 19, at a downstream air side of the evaporator 41 above the evaporator 41. As shown in FIG. 1, a heat-exchanging surface of the heater core 42 is positioned to have an approximate right angle relative to a heat-exchanging surface of the evaporator 41, at a vehicle rear-side position of the evaporator 41. In the first embodiment, the heater core 42 is a heating heat exchanger for heating air passing therethrough using hot water from a vehicle engine as a heating source.

The heater core 42 includes a heat-exchanging core portion 42c disposed between a hot-water inlet tank 42a and a hot water outlet tank 42b. The core portion 42c is constructed by alternatively stacking and joining plural flat tubes and plural corrugated fins.

For example, the heater core 42 is a one-way flow type (whole pass type) in which hot water from the hot-water inlet tank 42a flows through the whole flat tubes in one way toward the hot-water outlet tank 42b. That is, hot water flows through the whole flat tubes from below upwardly in the core portion 42c.

Relative to the evaporator 41 disposed approximately horizontally, the heater core 42 is disposed approximately vertically. Here, a lower end (e.g., hot-water inlet tank 42a) of the heater core 42 is disposed at a position proximate to one end of the evaporator 41 in the horizontal direction. As shown in FIG. 1, a predetermined clearance 43 is provided between the tank portion 41a at the one end side of the evaporator 41 and the hot-water inlet tank 42a at the lower end of the heater core 42, so that a heat insulation is performed between the evaporator 41 and the heater core 42 through the predetermined clearance 43.

According to the first embodiment of the present invention, the lower end of the heater core 42 is disposed near the vehicle rear side end of the evaporator 41 in the horizontal direction, and the heater core 42 is disposed approximately vertically above the evaporator 41. Therefore, a space 44 extending vertically in parallel with the heat-exchanging surface of the core portion 42c of the heater core 42 can be provided at a vehicle front side position of the heater core 42. A cool-air bypass passage 45, through which cool air having passed through the evaporator 41 flows as shown by the arrow F in FIG. 1 while bypassing the heater core 42, is provided at an upper side of the heater core 42 on the vehicle front side from the heater core 42.

A rotation shaft 46a of an air-mixing door 46 is disposed at a front side position of the heater core 42 around an upper side end of the heater core 42. The rotation shaft 46a is disposed to extend in the vehicle width direction, and is held in the case 19 to be rotatable by a bearing hole provided in a wall portion of the case 19. An upper end portion of the air mixing door 46 is integrally connected with the rotation shaft 46a, so that the air mixing door 46 is rotated around the rotation shaft 46a between the solid line position and the chain line position in FIG. 1. For example, the air mixing door 46 is formed in a plate like.

When the air mixing door 46 is at the solid line position in FIG. 1 (maximum cooling position), all the air passage of the core portion 42c of the heater core 42 is fully closed. On the other hand, when the air mixing door 46 is at the chain line in FIG. 1 (maximum heating position), the cool-air bypass passage 45 is fully closed so that all air from the evaporator 41 passes through the heater core 42. When the air mixing door 46 opens the air passage of the core portion 29c of the heater core 42, air in the space 44 passes through the core portion 42c from a vehicle front side to a vehicle rear side as shown by the arrow G in FIG. 1.

The air-mixing door 46 adjusts a ratio between an amount of warm air passing through the core portion 42c of the heater core 42 and an amount of cool air passing through the cool-air bypass passage 45 while bypassing the heater core 42, so that the temperature of air blown into the passenger compartment is adjusted.

An air mixing portion 47 is provided within the case 19 at a vehicle rear upper side of the heater core 42 and the cool-air bypass passage 45, so that warm air from the heater core 42 and cool air from the cool-air bypass passage 45 are mixed in the air mixing portion 47 to have a predetermined temperature. In FIG. 1, the air mixing portion 47 is provided at a position above the blower 12.

The mode switching portion 14 is disposed at an upper rear side of the air mixing portion 47. In the first embodiment, the mode switching portion 14 has an approximate semi-cylindrical seal surface 48 that extends in the vehicle width direction and is formed at an upper position of the case 19. A foot opening 49 is provided in a vehicle rear-side surface among the seal surface 48, a face opening 50 is provided at an upper side position of the foot opening 49 in the seal surface 48, and a defroster opening 51 is provided at a vehicle front-side position of the face opening 50 in the seal surface 48.

Inside the semi-cylindrical seal surface 48, a mode switching door 52 is disposed rotatably to be rotated around a rotation shaft 53. In the first embodiment, the mode switching door 52 is a rotary door with a door body 52a, for example. The door body 52a has a circumference wall surface with a predetermined curvature around the rotation shaft 53. A communication hole 52b is provided in the door body 52a at a predetermined position in the circumference direction. Accordingly, by the rotation of the door body 52a, the openings 49-51 can be selectively opened and closed.

The foot opening 49 communicates with a foot outlet 54a, provided at right and left sides in the vehicle width direction, through a foot air passage 54, so that air is blown toward the foot area of a passenger in the passenger compartment from the foot air outlet 54a. The face opening 50 is for blowing air toward the face area of the passenger in the passenger compartment through a face duct. Further, the defroster opening 51 is for blowing air toward an inner surface of a front windshield through a defroster duct.

The rotation shaft 53 of the mode switching door 52 is connected to a mode operation mechanism through a link mechanism, to be rotated and operated by the mode operation mechanism. Similarly, the rotation shaft 46a of the air mixing door 46 is connected to a temperature-adjustment operation mechanism through a like mechanism, so that an opening degree of the air mixing door 46 is adjusted by the temperature-adjustment operation mechanism. Further, the rotation shafts 30a, 30b of the inside/outside air switching door 29 is connected to an inside/outside air switching mechanism through a link mechanism, so that the inside/outside air switching door 29 is rotated and operated by the inside/outside air switching mechanism.

Each of the mode operation mechanism, the inside/outside air switching mechanism and the temperature-adjustment operation mechanism may be an automatic operation mechanism using a servo motor, or may be a manual operation mechanism manually operated by a manual operation of a passenger. In the first embodiment, the interior unit 10 is disposed in the passenger compartment partitioned from an engine compartment by a partition wall.

Next, operation of the interior unit 10 according to the first embodiment will be now described. When the fan 20 is rotated by the motor 21 in the arrow A direction, inside air or outside air is sucked from the inside/outside air switching portion 11, and is introduced into the suction port 23 of the scroll casing 22 through the connection duct 15.

Then, the sucked air is blown into the scroll casing 22 by the fan 20, and is blown from the vehicle rear side to the vehicle front side as shown by the arrow B in FIG. 1. Air blown by the fan 20 is introduced into the inlet passage 40 under the evaporator 41 from the vehicle rear side to the vehicle front side, and passes through the evaporator 41 upwardly from below as shown by the arrow E in FIG. 1 to be cooled. Next, air from the evaporator 41 is divided into cool air F passing through the cool-air bypass passage 45 and warm air G passing through the heater core 42 based on the opening degree of the air mixing door 46. That is, a ratio between the air amount passing through the heater core 42 and the air amount passing through the cool-air bypass passage 45 is adjusted, so that condensed air having a predetermined temperature can be obtained in the air mixing portion 47.

The mode switching door 52 is operated to selectively open and close the foot opening 49, the face opening 50 and the defroster opening 51, so that air is blown into the passenger compartment from at least one of the openings 49–51 to perform air-conditioning operation in the passenger compartment.

According to the first embodiment of the present invention, in both the case where the interior unit 10 is used for the vehicle having the right steering wheel and the case where the interior unit 10 is used for the vehicle having the left steering wheel, the entire shape of the case 19 of the interior unit 10 including the inside/outside air switching portion 11 and the blower 12 is formed to be right-left symmetrical, so that the interior unit 10 is used in common for both the vehicle having the right steering wheel and the vehicle having the left steering wheel.

That is, the first opening 26 and the second opening 27 are opened at both the right and left side portions of the air passage 24 extending in the vehicle width direction of the inside/outside air switching portion 11. In addition, one of both the openings 26, 27 is used as the inside air suction port, and the other one thereof is used as the outlet passage port and is coupled to the suction port 23 of the blower 12 through the connection duct 15. Accordingly, the case member 25 defining the air passage 24 including the inside air suction port and the outlet passage port can be formed into the same shape in both the vehicle having the right steering wheel and the vehicle having the left steering wheel.

Because the inside/outside air switching portion 11 is disposed at an approximate center in the interior unit 10 in the vehicle width direction, the outside air suction port 28 can be provided in the case member 25 defining the air passage 24 at the same position in the vehicle width direction regardless of the vehicle having the right steering wheel and the vehicle having the left steering wheel, to be connected to an outside passage in a cowl portion on the vehicle side. Accordingly, the outside air suction port 28 can be formed into the same shape in the case member 25 regardless of the vehicle having the right steering wheel and the vehicle having the left steering wheel, and an outside air introduction port can be provided in the cowl portion to have the same shape at one portion positioned on an approximate center in the vehicle width direction regardless of the vehicle having the right steering wheel and the vehicle having the left steering wheel. Therefore, the cowl portion on the vehicle side can be relatively readily set. As a result, the inside/outside air switching portion 11 can be readily used in common for both the vehicle having the right steering wheel and the vehicle having the left steering wheel.

The interior unit 10 including the inside/outside air switching portion 11, the blower 12, the heat-exchanging portion 13 and the mode switching portion 14 is constructed in the predetermined dimension W in the vehicle width direction. In addition, the blower 12, the heat-exchanging portion 13 and the mode switching portion 14 are positioned so that air flows in a direction (front-rear direction, up-down direction) perpendicular to the vehicle width direction. Therefore, the dimension W of the interior unit 10 in the vehicle width direction can be made shorter, and the interior unit 10 can be mounted on a space having a small width distance in the vehicle. Accordingly, the interior unit 10 can be readily mounted on a light car having a small width dimension. Thus, an operation space of a clutch pedal P1 (FIG. 2) of a manual transmission in the vehicle having the right steering wheel, and an operation space of a clutch pedal P2 (FIG. 3) of a manual transmission in the vehicle having the left steering wheel can be readily provided.

According to the first embodiment of the present invention, in each of the vehicle having the right steering wheel and the vehicle having the left steering wheel, one of the first opening 26 and the second opening 27, positioned at the driver's seat side, is used as the inside air suction port, and the other one thereof is used as the outlet passage port to be coupled to the suction port 23 of the blower through the connection duct 15. Therefore, in the interior unit 10 mounted on the vehicle at an approximate center in the vehicle width direction, the inside air suction port of the inside/outside air switching portion 11 can be always proximate to a space on the driver's seat side in the passenger compartment. Accordingly, inside air around the driver's seat in the passenger compartment can be always sucked from the inside air suction port, so that it can prevent air around the driver's seat side from staying, and air-conditioning feeling around the driver's seat side can be improved.

Figure 7:
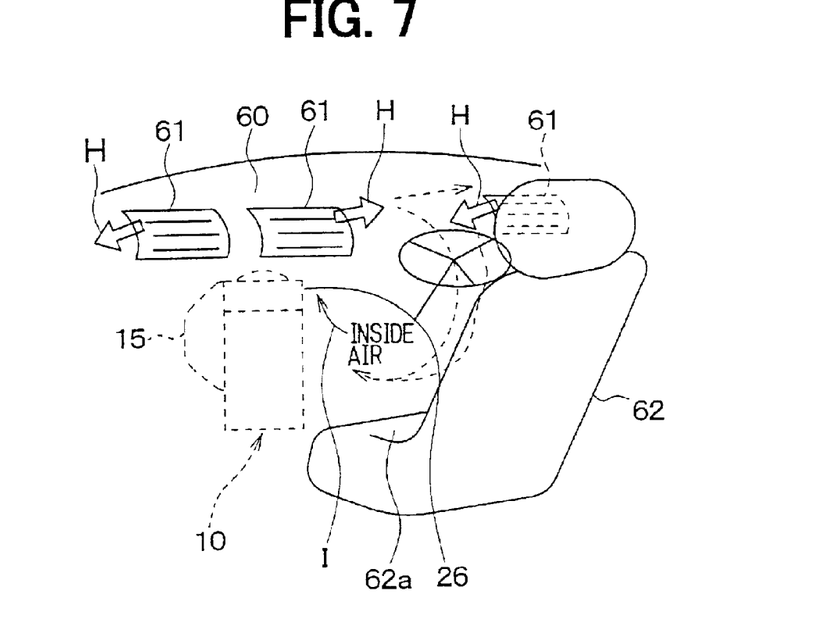
FIG. 7 is a schematic view for explaining the advantage of the air conditioner according to the first embodiment.

FIG. 7 shows the vehicle having the right steering wheel. As shown in FIG. 7, plural face air outlets 61 communicating with the face opening 50 of the interior unit 10 are provided on an instrument panel 60 at the front side of the vehicle. Air from the face air outlets 61 is blown toward the face side of a passenger in the passenger compartment as shown by arrow H in FIG. 7.

In this case, a part of inside air around a seat surface 62a of a driver's seat flows toward the first opening (inside air suction port) 26 positioned at an upper right side of the interior unit 10. Accordingly, in the cooling operation in the summer during the inside air mode, it can prevent air around the seat surface 62a of the driver's seat 62 from being sunken, thereby improving air-conditioning feeling around the driver's seat in the passenger compartment.

In addition, by suitably changing the position of the inside air suction port of the inside/outside air switching portion 11, the air-conditioning feeling around the driver's seat side can be further improved without providing special supplement air outlets.

According to the first embodiment of the present invention, since the inside/outside air switching portion 11 is arranged integrally with the mode switching portion 14 at a vehicle front side position of the mode switching portion 14, the inside/outside air switching portion 11 can be integrated as a part of the interior unit 10. Further, because the inside/outside air switching portion 11 is disposed at the vehicle front side of the mode switching portion 14, the inside/outside air switching portion 11 can be made close to the outside air passage of the cowl portion of the vehicle, and a connection between the outside air suction port 28 of the inside/outside air switching portion 11 and the air passage of the cowl portion of the vehicle can be made easy. Accordingly, it can prevent an interference between the inside/outside air switching portion 11, and a face duct connected to the face opening 50 of the mode switching portion 14 or a defroster duct connected to the defroster opening 51 of the mode switching portion 14.

The door body (door surface) 31 extending in the circular arc shape by the predetermined distance L in the axial direction (i.e., front-rear direction) of the rotation shafts 30a, 30b is constructed in the inside/outside air switching door 29, to open and close the inside air suction port (first opening 26 or the second opening 27) and the outside air suction port 28. Because the door body 31 forms a circular-arc door surface extending in the vehicle front-rear direction, the case member 25 accommodating the door body 31 can be formed into the cylindrical shape. Accordingly, it can further prevent an interference between the case member 25 and the semi-cylindrical mode switching portion 14. Thus, a mounting space of the interior unit 10, where the inside/outside air switching portion 11 is disposed at the vehicle front side of the mode switching portion 14 integrally, can be further reduced.

Figure 8:
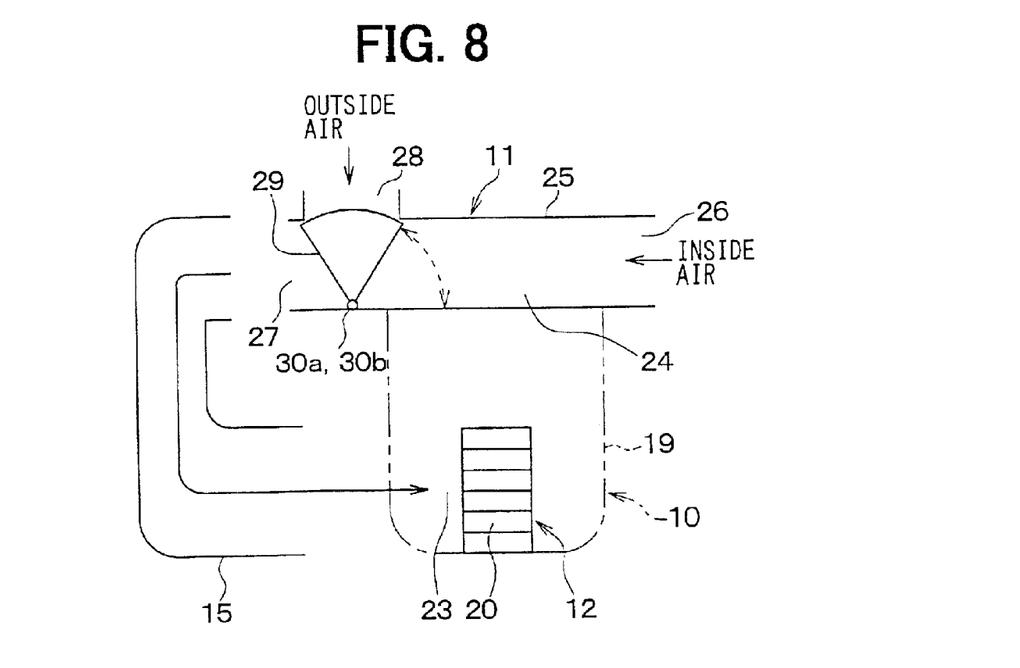
FIG. 8 is a schematic diagram for explaining a connection structure between an inside/outside air switching portion and a blower, according to a second preferred embodiment of the present invention.

A second preferred embodiment of the present invention will be now described with reference to FIG. 8.

In the above-described first embodiment of the present invention, the outside air suction port 28 is positioned at an approximate center in the inside/outside air switching portion 11 in the vehicle width direction, and the case 19 of the interior unit 10 including the inside/outside air switching portion 11 is formed to be right-left symmetrical. However, in the second embodiment, as shown in FIG. 8, the position of the outside air suction port 28 is set to be offset from the center portion of the inside/outside air switching portion 11 in the vehicle width direction.

Specifically, in the vehicle having the right-steering wheel, the outside air suction port 28 and the inside/outside air switching door 29 are provided in the inside/outside air switching portion 11, at a position proximate to the second opening 27 used as the outlet passage port. In the second embodiment, the outside air suction port 28 and the inside/outside air switching door 29 can be provided at a position proximate to the first opening 26. That is, the position of the outside air suction port 28 can be suitably set within the width dimension W (see FIGS. 2 and 3) of the case member 25 of the inside/outside air switching portion 11, so that a connection between the air passage of the cowl portion of the vehicle and the outside air suction port 28 can be made easy. Further, because the first opening 26 used as the inside air suction port is positioned near the driver's seat, the air-conditioning feeling around the driver's seat side can be improved, similar to the above-described first embodiment.

Figure 9:
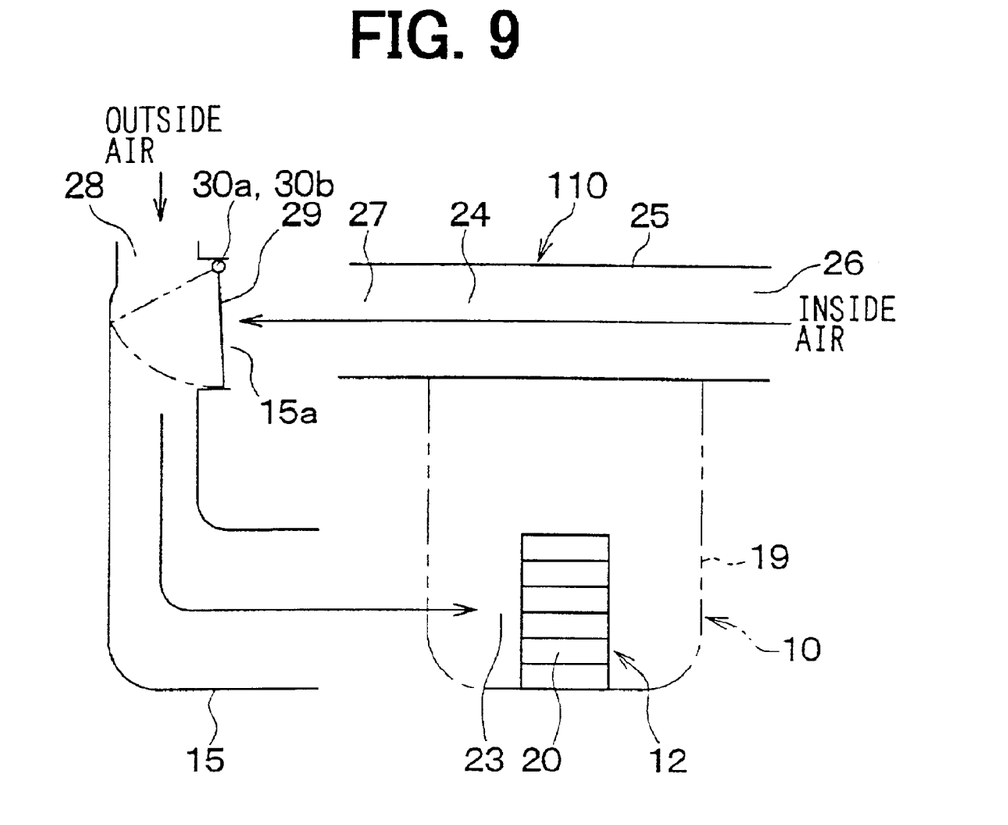
FIG. 9 is a schematic diagram for explaining a connection structure between an inside/outside air switching portion and a blower, according to a third preferred embodiment of the present invention.

A third preferred embodiment of the present invention will be now described with reference to FIG. 9. In the above-described first and second embodiments of the present invention, the outside air suction port 28 and the inside/outside air switching door 29 are provided in the case member 25 of the inside/outside air switching portion 11. However, in the third embodiment, as shown in FIG. 9, the outside air suction port 28 and the inside/outside air switching door 29 are provided at an upstream end portion of the connection duct 15.

Specifically, in the third embodiment, the case member 25 is used for an inside air suction portion only for the inside air suction, and an opening 15a provided at the upstream end portion of the connection duct 15 in the vehicle width direction is connected to the second opening 27 used as an inside air outlet. Further, the outside air suction port 28 is provided at an upper position of the upstream end portion of the connection duct 15 to be opened toward the vehicle upper side. The inside/outside air switching door 29 is disposed inside the upstream end portion of the connection duct 15, to open and close the opening 15a on the inside air suction side and the outside air suction port 28.

Even in the third embodiment of the present invention, the entire shape of an interior unit 110 including an inside air suction portion 11 is made to be right-left symmetrical, similarly to the above-described first embodiment. Therefore, the interior unit 110 including the inside air suction portion 110 can be used in common for both the vehicle having the right steering wheel and the vehicle having the left steering wheel. Further, because the first opening 26 used as the inside air suction port is positioned near the driver's seat side, the air-conditioning feeling around the driver's seat side can be improved.

Figure 10:
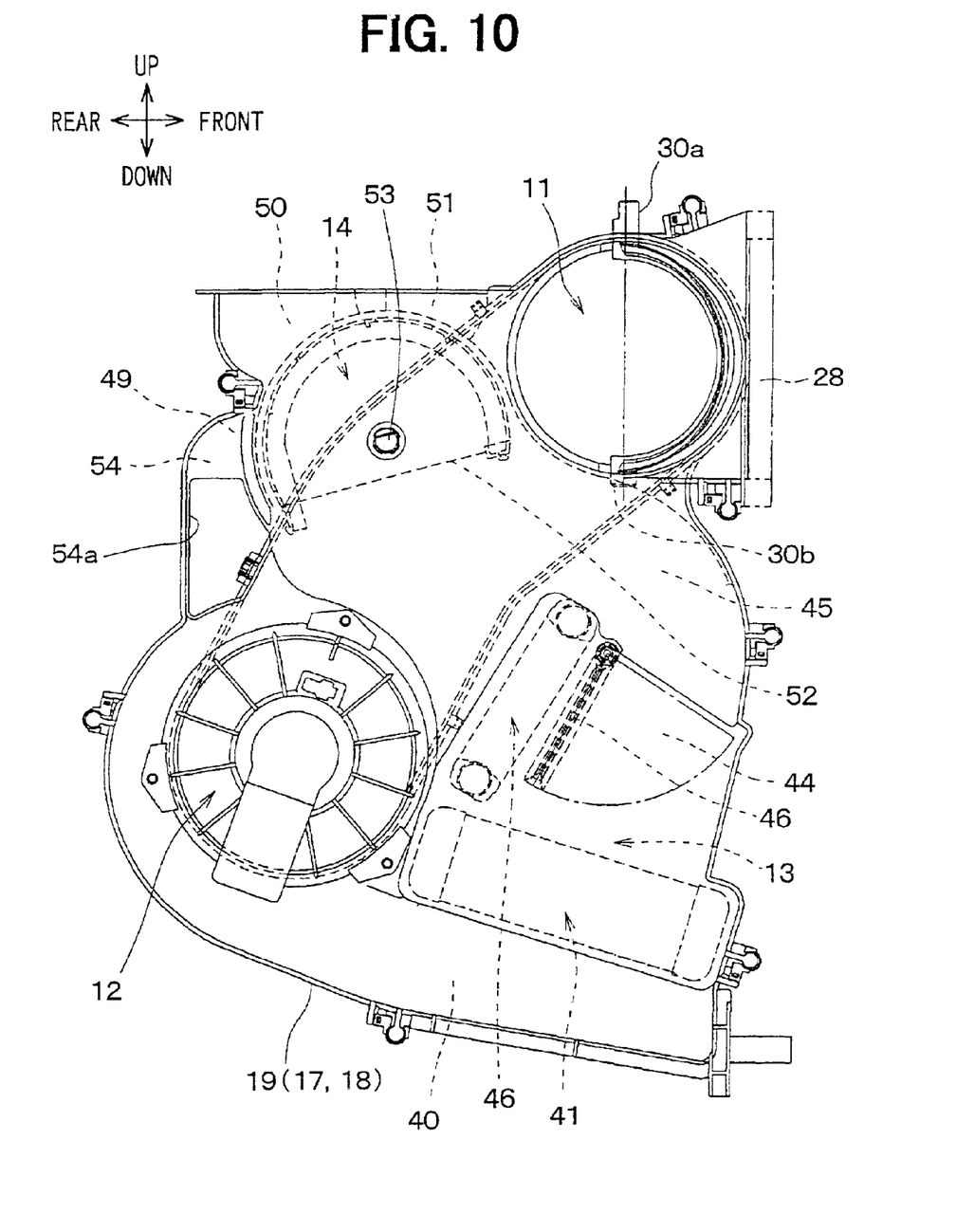
FIG. 10 is a schematic sectional view showing an interior unit of a vehicle air conditioner according to a fourth preferred embodiment of the present invention.

A fourth preferred embodiment of the present invention will be now described with reference to FIG. 10. In the above-described first embodiment of the present invention, the inside/outside air switching door 29 is disposed inside the air passage 24 of the case member 25 cylindrically extending in the vehicle width direction of the inside/outside air switching portion 11, so that the axial direction of the rotation shafts 30a, 30b is positioned in the vehicle front-rear direction, and the outside air suction port 28 is positioned above the air passage 24. However, in the fourth embodiment, as shown in FIG. 10, the axial direction of the rotation shafts 30a, 30b is positioned in the vehicle up-down direction, and the outside air suction port 28 is provided at a vehicle front side of the air passage 24.

In this embodiment, by suitably setting the arrangement direction of the rotation shafts 30a, 30b of the inside/outside air switching door 29, the outside air suction port 28 of the inside/outside air switching portion 11 can be set at a position corresponding to the outside air passage of the cowl portion of the vehicle. In the fourth embodiment, the other parts are similar to those of the above-described first embodiment.

Although the present invention has been fully described in connection with the preferred embodiments thereof with reference to the accompanying drawings, it is to be noted that various changes and modifications will become apparent to those skilled in the art.

For example, in the above-described first embodiment of the present invention, the same-shaped openings are provided in both the side surfaces of the scroll casing 22 in the vehicle width direction. In addition, one of the two openings is used as the suction port 23 and the other one thereof is closed by the circular flange portion 21a of the motor 21, so that the scroll casing 22 can be made right-left symmetrical. However, the shape of the opening used as the suction port 23 can be made different from the other opening closed by the flange portion 21a of the motor 21 in the scroll casing 22. In this case, an exchangeable partial die is provided in the die for manufacturing the general division case members 17, 18, so that the right-left different portion of the scroll casing 22 is resolved by the exchangeable partial die. That is, when an interior unit 10 is manufactured for the vehicle having the left steering wheel in the base of an interior unit 10 for the vehicle having the right steering wheel, the right-left different opening shapes of the division case members 17, 18 can be molded by using the exchangeable partial die.

In the above-described first embodiment of the present invention, the air mixing door 46 is used as a temperature adjustment unit for adjusting the temperature of air blown into the passenger compartment. However, as the temperature adjustment unit, a hot water valve for adjusting a flow amount or a temperature of hot water flowing into the heater core 42 can be used.

In the first embodiment of the present invention, the heat core 42 is disposed above the evaporator 41 so that an extension line of the heat-exchanging surface of the heater core 42 crosses with that of the heat-exchanging surface by an approximate right angle. However, the heater core 42 may be disposed above the evaporator 41 approximately horizontally. In this case, a slide door sliding along a heat-exchanging surface of the core portion 42c of the heater core 42 can be used. In addition, a plate-like door may be used as the mode switching door 52. Even in this case, the present invention can be also applied.

In the above-described embodiments of the present invention, one of the first and second openings 26, 27 is used as the inside air suction port for introducing inside air, and the other one thereof is used as the outlet air passage port coupled to the suction port 23 of the blower 12. However, introduction air from the one of the first and second openings 26, 27 is not limited to only inside air. That is, one of the first and second openings 26, 27 can be used as an air suction port for introducing air (i.e., inside air, outside air), and the other one thereof can be used as an outlet air passage port coupled to the suction port 23 of the blower 12.

Such changes and modifications are to be understood as being within the scope of the present invention as defined by the appended claims.

What is claimed is:

1. An air conditioner in combination with a vehicle having a passenger compartment, comprising:
    a case member defining an air passage extending in a vehicle width direction, the case member having an outside air suction port for introducing outside air outside the passenger compartment into the air passage, and first and second openings opened in the air passage at right and left end sides of the air passage in the vehicle width direction, one of the first and second openings being used as an inside air suction port for introducing inside air inside the passenger compartment into the air passage, and the other one of the first and second openings being used as an air outlet port;
    a blower for blowing air, the blower having a suction port from which air from the air outlet port of the case member is sucked;
    a connection member through which the air outlet port of the case member is coupled to the suction port of the blower; and
    an inside/outside air switching member, disposed in the case member, for opening and closing the outside air suction port and the inside air suction port; wherein
    the case member has therein the blower, a heat-exchanging portion for performing a heat exchange with air blown by the blower, and a mode switching portion for switching a flow direction of air to be blown into the passenger compartment, the case member is arranged at a vehicle center portion in a vehicle width direction, and the connection member is detachably connected to the case member;
    the one of the first and second openings is positioned at a vehicle right side, the other one of the first and second openings is positioned at a vehicle left side and the suction port of the blower is positioned at the vehicle left side when the vehicle has a right steering wheel; and
    the one of the first and second openings is positioned at the vehicle left side, the other one of the first and second openings is positioned at the vehicle right side and the suction port of the blower is positioned at the vehicle right side when the vehicle has a left steering wheel.

2. The combination according to claim 1, wherein the outside air suction port is provided in the case member at an approximate center of the air passage in the vehicle width direction.

3. The combination according to claim 1, wherein the outside air suction port is provided in the case member at a position offset from a center of the air passage in the vehicle width direction.

4. The combination according to claim 1, wherein the outside air suction port is provided in the case member at an upper portion of the air passage.

5. The combination according to claim 1, wherein:
    the mode switching portion is disposed above the heat-exchanging portion;
    the case member is disposed above the heat-exchanging portion at a vehicle front side of the mode switching portion; and the blower is disposed at a vehicle rear side of the heat-exchanging portion.

6. The combination according to claim 1, wherein:

the blower including a scroll casing having two openings provided with the same shape on right and left side surfaces, a centrifugal fan disposed in the scroll casing for blowing air, a motor for driving the centrifugal fan;

one of the two openings of the scroll casing is used as the suction port connected to the connection duct; and the motor is disposed in the other one of the two openings of the scroll casing.

7. The combination according to claim 1, wherein:

the case member is disposed integrally with the mode switching portion at a vehicle front side of the mode switching portion;

the inside/outside air switching door is rotatably disposed in the case member around a rotation axis;

the inside/outside air switching door has a door surface extending in an approximate circular arc shape within a predetermined dimension in an axial direction of the rotation axis; and the inside air suction port and the outside air suction port are opened and closed by the door surface of the inside/outside air switching door.

8. An air conditioner in combination with a vehicle having an instrument panel on a front side of a passenger compartment, comprising:

an interior unit, disposed inside the instrument panel at an approximate center in a vehicle width direction, the interior unit including:

an inside/outside air switching portion for introducing air, a blower, having a suction port, for blowing air introduced from the inside/outside air switching portion, a heat-exchanging portion for performing a heat exchange with air blown by the blower, and a mode switching portion for switching a flow direction of air in the passenger compartment, wherein:

the inside/outside air switching portion includes an inside/outside air case defining an air passage extending in a vehicle width direction;

the inside/outside air case has an outside air suction port for introducing outside air outside the passenger compartment into the air passage, and first and second openings opened in the air passage at right and left end sides of the air passage in the vehicle width direction, one of the first and second openings being used as an inside air suction port for introducing inside air inside the passenger compartment into the air passage, and the other one of the first and second openings being used as an air outlet port;

the air outlet port of the inside/outside air case is coupled to the suction port of the blower through a connection duct;

the inside/outside air switching portion includes an inside/outside air switching member, disposed in the inside/outside air case, for opening and closing the outside air suction port and the inside air suction port;

the connection duct is detachably connected to the inside/outside air case;

the one of the first and second openings is positioned at a vehicle right side, the other one of the first and second openings is positioned at a vehicle left side and the suction port of the blower is positioned at the vehicle left side when the vehicle has a right steering wheel; and the one of the first and second openings is positioned at the vehicle left side, the other one of the first and second openings is positioned at the vehicle right side and the suction port of the blower is positioned at the vehicle right side when the vehicle has a left steering wheel.

9. The combination according to claim 8, wherein:

the blower includes a scroll casing, a centrifugal fan disposed in the scroll casing to have a rotation axis in the vehicle width direction, and a motor for driving the fan;

the scroll casing has two openings formed on right and left side surfaces, respectively, to have the same shape;

one of the two openings of the scroll casing is used as the suction port connected to the connection duct; and the motor is disposed in the other one of the two openings of the scroll casing.

10. The combination according to claim 9, wherein the scroll casing and the fan are disposed at an approximate center of the interior unit in the vehicle width direction.

11. The combination according to claim 8, wherein:

the inside/outside air switching portion is disposed at one side of the heat-exchanging portion and the mode switching portion; and the blower is disposed at the other side of the heat-exchanging portion and the mode switching portion, opposite to the inside/outside air switching portion.

12. The combination according to claim 8, wherein the inside/outside air switching portion is disposed above the heat exchanging portion at a vehicle front side of the mode switching portion.

13. The combination according to claim 12, wherein the blower is disposed at a vehicle rear side of the heat-exchanging portion.

* * * * *